May 31, 1955      A. McK. LARKIN      2,709,744
CAR HEATING ATTACHMENT

Filed March 16, 1953      2 Sheets-Sheet 1

INVENTOR:
A. McKay Larkin,
BY
OO Martin
ATTORNEY

May 31, 1955

A. McK. LARKIN 2,709,744

CAR HEATING ATTACHMENT

Filed March 16, 1953

INVENTOR:
A. McKAY LARKIN,
BY
O D Martin
ATTORNEY.

2,709,744

CAR HEATING ATTACHMENT

Artemas McKay Larkin, Glendale, Calif., assignor, by mesne assignments, to W. L. Jencks, Glendale, Calif.

Application March 16, 1953, Serial No. 342,560

7 Claims. (Cl. 219—39)

This invention relates to a portable air circulating and heating device for use primarily within automobiles and house trailers, but which is equally adapted for use within any portion of a building requiring such air conditioning.

It is the general object of the invention to provide a simple, compact and inexpensive air circulating and heating apparatus. More particularly it is the object of the invention to provide an apparatus of the type referred to which is mountable within a casing in such a convenient manner that it may be removed from the casing and as readily re-seated therein by anyone familiar with the art by means of parts especially designed for this purpose.

Another object is to provide a device including a heat element which is so placed within a heat insulating housing that the heat generated in this element, by means of a fan placed adjacent thereto, may be expelled from the casing for air conditioning purposes without materially or uncomfortably raising the temperature within the casing to the end that the device may be handled without discomfort.

A still further object is to provide within the device of the invention thermostatically controlled switch means which, if for some reason the temperature within the heat element housing rises above a predetermined point, automatically will break the circuit through this element. A still further object is to provide, in connection with this thermostatic control, means operable from without the casing again to reset the switch to close the circuit through the heat element.

Other objects of the invention, together with many advantageous features thereof, will hereinafter be fully described and drawings are hereto appended in which a preferred form of the invention is illustrated.

Figure 1:
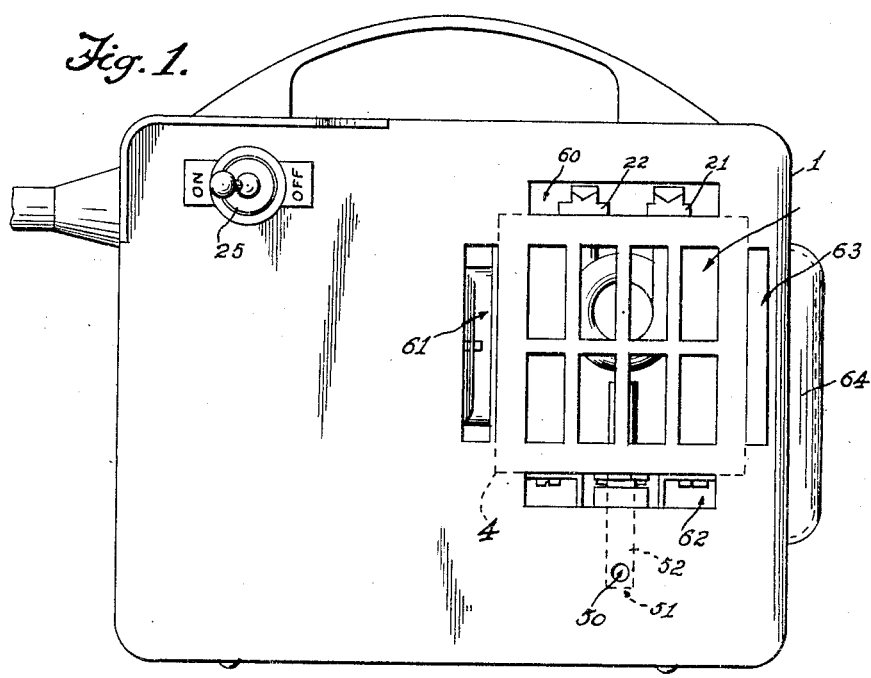
Fig. 1 is a front elevational view of a portable air conditioning device embodying the invention.
Figure 2:
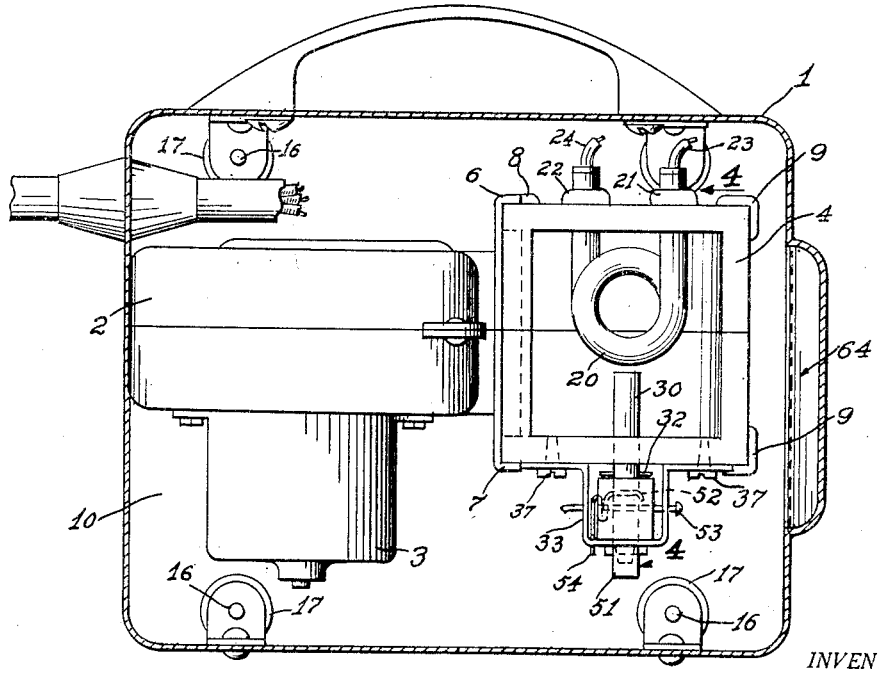
Fig. 2 is a substantially corresponding view of the device with the front wall of the casing broken away in order to disclose the interior mechanism thereof.

As indicated in Figs. 1 and 2, the casing 1 is rectangular in shape, it is open at the rear end thereof and of a size to receive therein a fan 2 which by an electric motor 3 is operated to force air through a box-shaped housing 4 for discharge through a grilled opening 5 in the front plate of the casing. A cover 10 closes the rear opening of the casing and the casing and cover are fitted with alined inwardly projecting flanges 8, 9.

Figure 3:
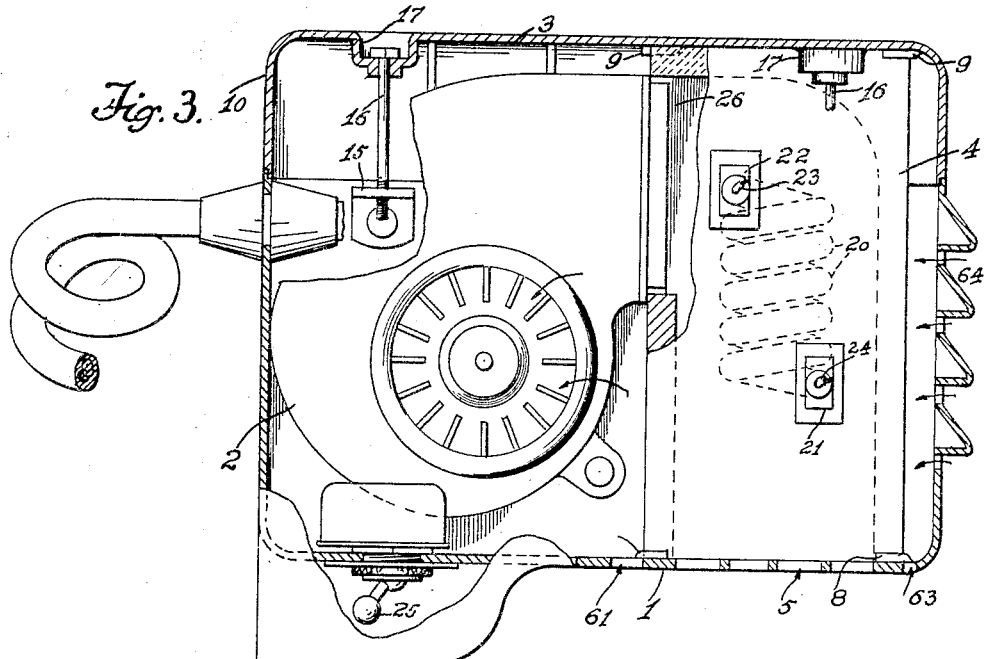
Fig. 3 is a plan view of the device with the top plate of the casing broken away for the sake of clearness.

The blower 2 is at the outlet thereof shown fitted with flanges 6, 7 within which the housing 4 is firmly held and the outer casing is, as best shown in Fig. 3, fitted with the said inwardly projecting guide flanges 8, 9 of a size to receive therein the ends of this housing. When so constructed, it is found that the blower and heating assembly may be pushed into the casing along these guides and will be held firmly in position therein by the said flanges when the cover 10 is placed thereon completely to enclose this assembly.

The casing 1 is at the open end thereof fitted with lugs 15 for receiving clamping screws 16 and the latter are shown seated within sockets 17 of the cover to clamp the latter firmly in position on the main portion of the casing, substantially as indicated in Fig. 3 of the drawings.

The blower 2 and the motor 3 may be of any commercially well known construction and they are so proportioned that, when placed within the casing and locked in position therein by the clamping screws 16 they will fit so snugly within the flanges of the casing and cover that vibration and rattling are entirely eliminated.

The housing 4 is of a size to receive therein a heat element in the form of a coil 20, the ends of which are held within terminals 21, 22 and conductors 23, 24 extend from these terminals to a manually operable switch 25 on the front plate of the casing, as indicated in Fig. 1. As stated, the housing is made from suitable heat insulating material, such as the commercially well known composition Marinite, and it is, as best shown in Fig. 2, preferably made in two parts in order to facilitate mounting therein of the heat element together with other instrumentalities, as will be described presently.

Figure 4:
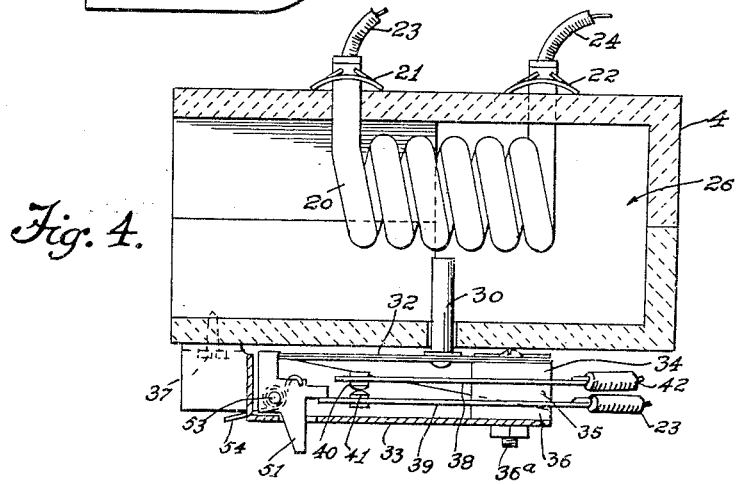
Fig. 4 is a sectional view of the heat generating and controlling elements of the mechanism as they appear when removed from the casing and taken in the direction of the arrow 4 of Fig. 2.

As best shown in Figs. 1 and 4, an opening 26 is cut into the side of the housing 4 in registration with the discharge opening of the blower so as to provide a clear unobstructed passage of the air from the blower through the housing and cut through the grille 5 in the front plate of the casing.

It was above stated that mechanism is provided for disrupting the circuit through the heat element in case the temperature within the housing for some reason should rise above a predetermined degree. Illustrative of such control, I have shown a stem 30 projecting into the housing with the inner end thereof in close proximity to the heating coil. This stem is made from suitable heat conducting material and it extends through an opening in the bottom of the housing, the outer end of the stem being rigidly secured to the free end of a bi-metallic bar 32. The upper end of this bar is in Fig. 4 shown mounted in a bracket 33, from which it is insulated by means of non-conducting elements 34, 35. A bolt 36ª extends through the bracket and these non-conducting elements to lock the bar 32 rigidly in position thereon. The latter is, by means of screws such as indicated at 37 in Fig. 2, rigidly mounted in position on the bottom surface of the housing.

A contact member 39 is mounted between the non-conducting elements 35 and 36 and it extends inwardly in spaced relation to a second contact member 38. Contact points 40, 41 are placed at the outer free ends of these members and they are by the resilience of the members held pressed together normally to maintain the circuit closed through this switch. The conductor 23 leading from one end of the heating coil is secured to the upper projecting end of the contact member 39 and a conductor 42 extends from the contact member 38 to the switch 25.

Figure 5:
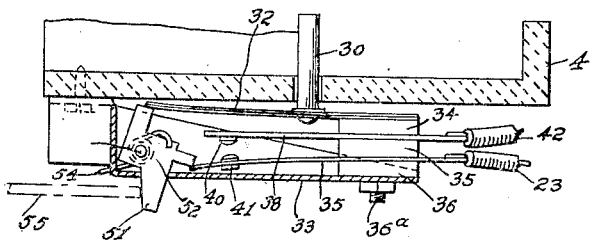
Fig. 5 shows the mechanism in a different position of adjustment.

As best shown in Figs. 4 and 5, a rock frame 52 is mounted on a pivot 53 of the bracket 33. This rock frame is by a spring 54 urged into position indicated in Fig. 5 and will assume this position when the bi-metallic bar 32 is caused to flex, as above explained, thereby to swing the contact member 39 away from the member 38 and so to break the circuit through this control switch. Since this switch is mounted within the casing of the device, and so cannot be manually reset it follows that the circuit will remain open, thereby to give warning that conditions have arisen within the device requiring inspection by a trained, authorized operator.

The circuit through the electric motor extends from the switch 25 in parallel with the heating coil circuit, for which reason it is found that the motor circuit remains unaffected by such thermostatic disruption of the heating coil circuit.

Referring now to Fig. 1, it is noticed that an opening 50 is cut through the front wall of the casing in axial alignment with an arm 51 outwardly extending from the rock frame 52. In order again to close this control circuit, it becomes necessary to insert a tool in the form of a rod 55 of a size to pass through the opening in the front plate of the casing and to advance this tool against the projecting end 51 of the rock frame, thereby to swing the latter in counter-clockwise direction against the tension of the spring 54 far enough to permit the bar 32 to return to its initial position of Fig. 4 and so to lock the rock frame against forward movement by its spring. The contact member 39 is at the same time released for movement to close the circuit through the heating coil. It is presumed, of course, that the bi-metallic bar 32 in the meanwhile has had time to cool off sufficiently to resume its initial position. When such arrangement is provided, it is seen that it will not be possible for any ordinary unauthorized person manually to reset the switch and that for this reason there is no danger of the heating assembly becoming permanently damaged by excessive heat, but that thorough inspection and repair may be effected to restore normal functioning thereof.

It is above stated that the cover 10 is clamped in position by means of screws 16, the heads of which take a position within sockets 17 of the cover. When these sockets are made rather deep, as shown in Fig. 3, and when the heads of the screws 16 are of an odd size to compel use of a special wrench, it is seen that it will be very difficult to loosen these screws to remove the cover from the casing by any ordinary, unauthorized person. This is also a very important feature inasmuch as it compels the user of the device to have the interior mechanism inspected and, if necessary, repaired by a competent person, authorized to effect such repairs.

As stated, the current of air from the blower is discharged through the openings of window 5 in the front plate of the casing. Additional openings 60, 61, 62 and 63 are cut through this plate in position to form inlets for air to flow along the outer surfaces of the heat insulating box 4 into the blower. This flow of air is effective to carry away what little heat may penetrate the insulating wall of the housing 4 and so further to assist in maintaining the casing 1 reasonably cool at all times. In addition it may be found advantageous to place inlets in the end plate casing in the form of louvers, such as indicated at 64 in the drawing.

I claim:

1. A portable electrically actuated air circulating device including a casing having a grilled opening in the front wall thereof, a cover for said casing, means for clamping the cover in position on the casing, the casing and cover having flanges inwardly projecting therefrom, a box-shaped housing seatable within said casing and cover flanges are rigidly held in position therein when the cover is mounted on the casing, the housing opening into said grilled casing opening, said housing being made from heat insulating material, a heat element within the housing, a motor driven fan rigidly secured to said housing, the housing having an opening in the wall thereof communicating with the discharge opening of said fan, a circuit through the fan motor, a circuit through said heat element, a switch on the casing controlling the flow of current to said circuits, and a thermostatic control in the heating element circuit mounted on the housing and having a stem extending into the housing in close proximity to the heat element.

2. A portable electrically actuated air circulating device including a casing having a grilled opening in the front wall thereof, a cover for said casing, means for clamping the cover in position on the casing, the casing and cover having flanges inwardly projecting therefrom, a box-shaped housing seatable within said casing and cover flanges are rigidly held in position therein when the cover is mounted on the casing, the housing opening into said grilled casing opening, said housing being made from heat insulating material, a heat element within the housing, a motor driven fan rigidly secured to said housing, the housing having an opening in the wall thereof communicating with the discharge opening of said fan, a circuit through the fan motor, a circuit through said heat element, a switch on the casing controlling the flow of current to said circuits, a normally closed switch mounted on the housing, a bi-metallic bar associated with said switch, and a heat conducting stem on said bar, said stem extending through the housing wall nearly to said heat element, heat induced flexing of the bar releasing the switch for opening movement.

3. A portable electrically actuated air circulating device including a casing having a grilled opening in the front wall thereof, a cover for said casing, means for clamping the cover in position on the casing, the casing and cover having flanges inwardly projecting therefrom, a box-shaped housing seatable within said casing and cover flanges are rigidly held in position therein when the cover is mounted on the casing, the housing opening into said grilled casing opening, said housing being made from heat insulating material, a heat element within the housing, a motor driven fan rigidly secured to said housing, the housing having an opening in the wall thereof communicating with the discharge opening of said fan, a circuit through the fan motor, a circuit through said heat element, a switch on the casing controlling the flow of current to said circuits, a normally closed switch on the housing, a rock frame adjacent said switch, a spring urging movement of said rock frame to open the switch, a bi-metallic bar on the housing restraining movement of the bellcrank, and a heat conducting stem on the bar, said stem extending through the housing wall nearly to the heat element, heat flowing through the stem causing the bar to flex thereby to release the rock frame for switch opening movement.

4. A portable electrically actuated air circulating device including a casing having a grilled opening in the front wall thereof, a cover for said casing, means for clamping the cover in position on the casing, the casing and cover having flanges inwardly projecting therefrom, a box-shaped housing seatable within said casing and cover flanges are rigidly held in position therein when the cover is mounted on the casing, the housing opening into said grilled casing opening, said housing being made from heat insulating material, a heat element within the housing, a motor driven fan rigidly secured to said housing, the housing having an opening in the wall thereof communicating with the discharge opening of said fan, a circuit through the fan motor, a circuit through said heat element, a switch on the casing controlling the flow of current to said circuits, a normally closed switch on the housing, a rock frame adjacent said switch, a spring urging movement of said rock frame to open the switch, a bi-metallic bar on the housing restraining movement of the bellcrank, a heat conducting stem on the bar, said stem extending through the housing wall nearly to the heat element, heat flowing through the stem causing the bar to flex thereby to release the rock frame for switch opening movement, and a manually operable switch on the casing controlling flow of current to said circuits.

5. A portable electrically actuated air circulating device including a casing having a grilled opening in the front wall thereof, a box-shaped housing within said casing opening into said grilled casing opening, said housing being made from heat insulating material, a heat element within the housing, a motor driven fan, the housing having an opening in the wall thereof communicating with the discharge opening of said fan, a circuit through the fan motor, a circuit through said heat element, a switch on the casing controlling the flow of current to said circuits, a normally closed switch on the housing, a rock frame adjacent said switch, a spring urging movement of said rock frame to open the switch, a bi-metallic bar on the housing restraining movement of the bellcrank, a heat conducting stem on the bar, said stem extending through the housing wall nearly to the heat element, heat flowing through the stem causing the bar to flex thereby to release the rock frame for switch opening movement, and means insertable through the casing for returning the rock frame to its initial position, thereby to release the switch for closing movement.

6. A portable electrically actuated air circulating device including a casing having a grilled opening in the front wall thereof, a box-shaped housing within said casing opening into said grilled casing opening, said housing being made from heat insulating material, a heat element within the housing, a motor driven fan, the housing having an opening in the wall thereof communicating with the discharge opening of said fan, a circuit through the fan motor, a circuit through said heat element, a switch on the casing controlling the flow of current to said circuits, a normally closed switch on the housing, a rock frame adjacent said switch, a spring urging movement of said rock frame to open the switch, a bi-metallic bar on the housing restraining movement of the bellcrank, a heat conducting stem on the bar, said stem extending through the housing wall nearly to the heat element, heat flowing through the stem causing the bar to flex thereby to release the rock frame for switch opening movement, the casing having a small hole in the wall thereof in alignment with the rock frame, and a tool insertable through said hole and axially movable to return the rock frame to its initial position against the tension of its spring.

7. A portable electrically actuated air circulating device including a casing having a grilled opening in the front wall thereof, a box-shaped housing within said casing opening into said grilled casing opening, said housing being made from heat insulating material, a heat element within the housing, a motor driven fan, the housing having an opening in the wall thereof communicating with the discharge opening of said fan, a circuit through the fan motor, a circuit through said heat element, a switch on the casing controlling the flow of current to said circuits, a normally closed switch on the housing, a rock frame adjacent said switch, a spring urging movement of said rock frame to open the switch, a bi-metallic bar on the housing restraining movement of the bellcrank, a heat conducting stem on the bar, said stem extending through the housing wall nearly to the heat element, heat flowing through the stem causing the bar to flex thereby to release the rock frame for switch opening movement, the casing having a small hole in the wall thereof in alignment with the rock frame, a tool insertable through said hole and axially movable to return the rock frame to its initial position against the tension of its spring and a manually operable switch on the casing controlling flow of current to said circuits.

References Cited in the file of this patent

UNITED STATES PATENTS

| 1,914,334 | Stoddard | June 13, 1933 |
| 1,978,413 | Child | Oct. 30, 1934 |
| 1,998,670 | Goshorn et al. | Apr. 23, 1935 |
| 2,408,286 | Aufiero | Sept. 24, 1946 |
| 2,475,113 | Stiles | July 5, 1949 |
| 2,573,445 | Hutcheson | Oct. 30, 1951 |
| 2,694,136 | Smith | Nov. 9, 1954 |